US010134138B2

(12) United States Patent
Kimura

(10) Patent No.: US 10,134,138 B2
(45) Date of Patent: Nov. 20, 2018

(54) INFORMATION PROCESSING APPARATUS, COMPUTER-READABLE STORAGE MEDIUM, INFORMATION PROCESSING METHOD

(71) Applicant: CANON KABUSHIKI KAISHA, Tokyo (JP)

(72) Inventor: Mitsuo Kimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/451,789

(22) Filed: Mar. 7, 2017

(65) Prior Publication Data
US 2017/0262999 A1 Sep. 14, 2017

(30) Foreign Application Priority Data

Mar. 9, 2016 (JP) .................. 2016-045469

(51) Int. Cl.
G06K 9/00 (2006.01)
G06T 7/11 (2017.01)
G06T 7/73 (2017.01)
G06K 9/46 (2006.01)
G06K 9/32 (2006.01)

(52) U.S. Cl.
CPC .............. *G06T 7/11* (2017.01); *G06K 9/3258* (2013.01); *G06K 9/4604* (2013.01); *G06T 7/73* (2017.01); *G06K 2209/01* (2013.01)

(58) Field of Classification Search
CPC .......... G06K 9/4604; G06K 9/34; G06K 9/72; G06K 9/3233; G06K 2209/01; G06T 7/11; G06T 7/73; G06F 17/2735; G06F 17/30675; G06F 17/2755
See application file for complete search history.

(56) References Cited

U.S. PATENT DOCUMENTS

2008/0170810 A1* 7/2008 Wu ...................... G06K 9/4671
382/305
2011/0255795 A1* 10/2011 Nakamura ........... G06K 9/3233
382/229
2011/0305388 A1* 12/2011 Wedi ....................... G06T 5/005
382/165
(Continued)

FOREIGN PATENT DOCUMENTS

JP 11-143983 A 5/1999

*Primary Examiner* — Ali Bayat
(74) *Attorney, Agent, or Firm* — Canon U.S.A., Inc. IP Division

(57) ABSTRACT

According to an aspect of the embodiments, a search region is set for a recognition target image, cut regions are set at a plurality of positions in the search region, images respectively corresponding to the plurality of set cut regions are extracted, each of the extracted images is compared with dictionary data to detect candidate character information and position information about the cut region that corresponds to the candidate character. Then, the candidate character information that has the highest evaluation value in the detected candidate character information is output as a recognition result, and based on the position information about the cut region corresponding to the recognition result, a search region for a next character is set.

9 Claims, 15 Drawing Sheets

(56) References Cited

U.S. PATENT DOCUMENTS

2012/0023399 A1* 1/2012 Hoshino ............. G06F 17/2735
715/256
2015/0284786 A1* 10/2015 Shapero ............... C12Q 1/6827
506/2

* cited by examiner

FIG. 1
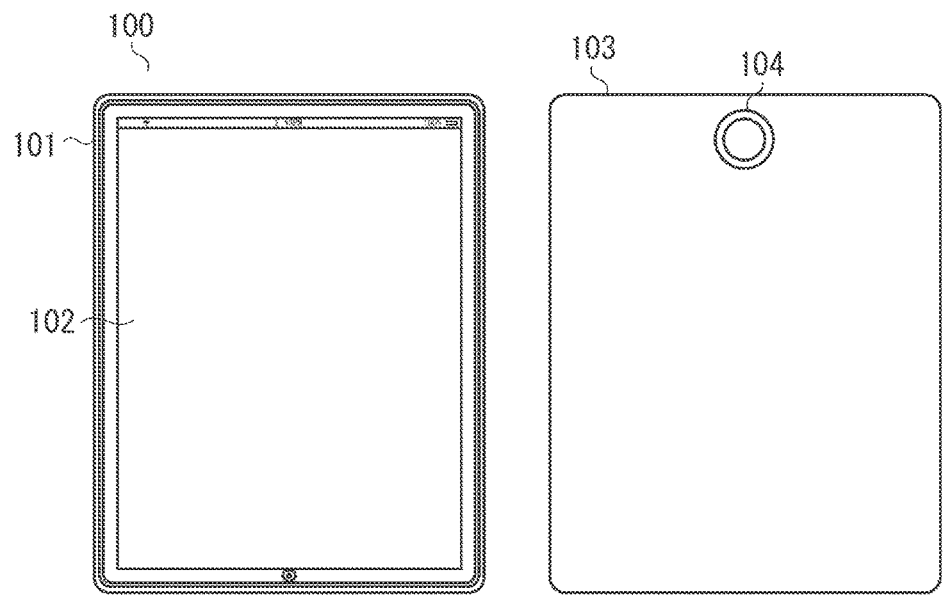
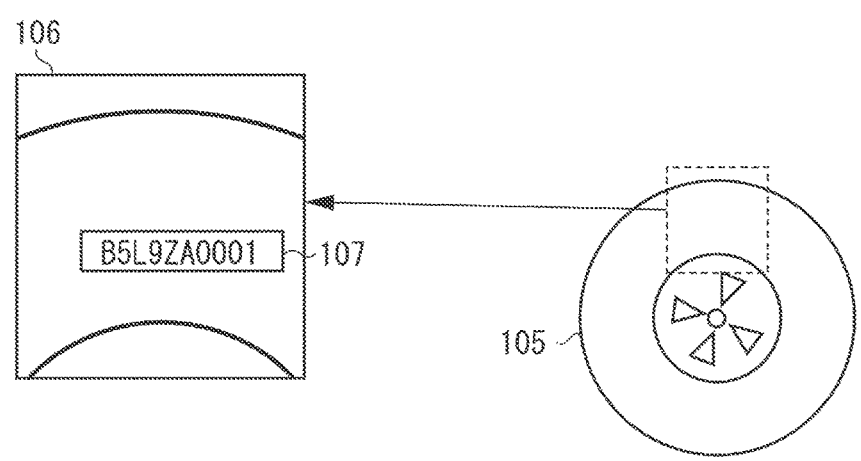

FIG. 5
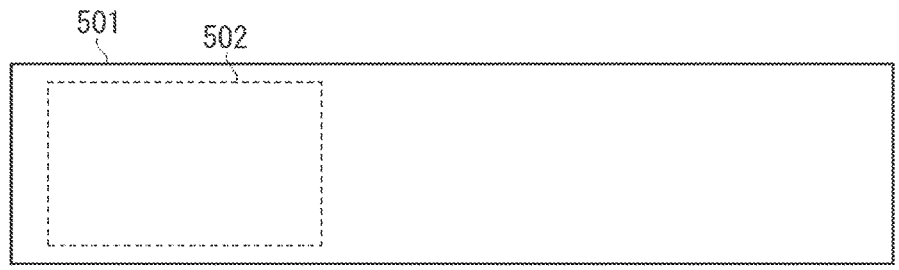
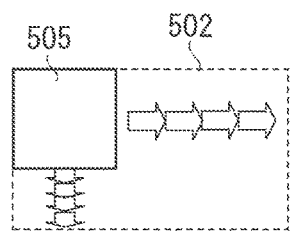
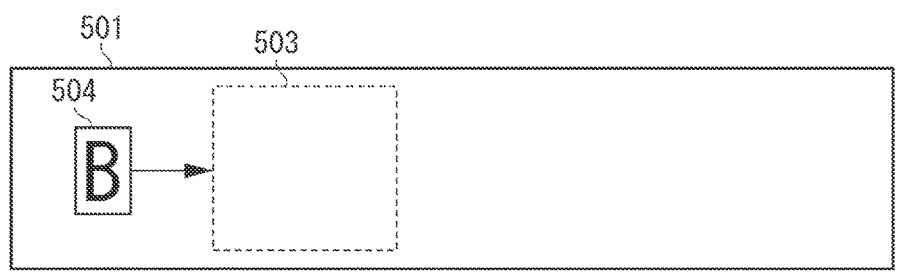
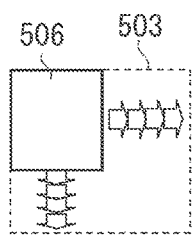

FIG. 9
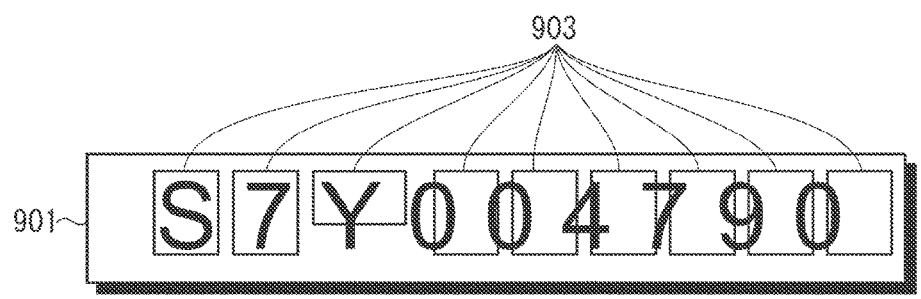
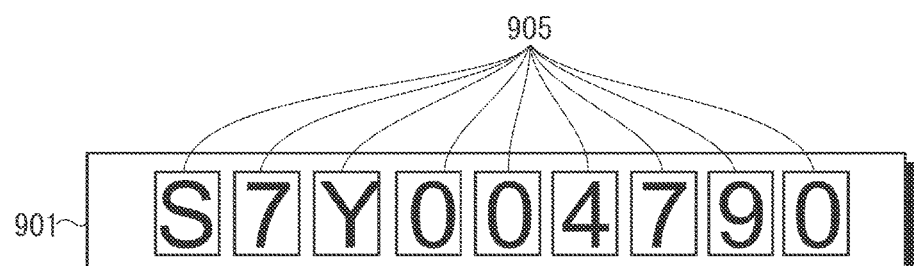

INFORMATION PROCESSING APPARATUS, COMPUTER-READABLE STORAGE MEDIUM, INFORMATION PROCESSING METHOD

BACKGROUND OF THE INVENTION

Field of the Invention

One disclosed aspect of the embodiments relates to character recognition processing.

Description of the Related Art

In conventional character recognition processing performed on a document image acquired by scanning a sheet document, the outlines (contours) of characters are detected from the document image, a character image is cut for each of the characters, and character recognition processing is performed on the cut character images to identify the characters. The characters are not correctly recognized if the cutting positions of the characters are inappropriate, so that techniques for correcting the cutting positions of characters according to a user instruction are provided. For example, in one technique, in a case where a single character image is cut as a plurality of characters (e.g., a case where a single character image is cut as two characters due to a blurred portion of the character image, and a case where a single Chinese character is divided into a left and right Chinese character radicals and cut), the plurality of characters is corrected as the single character. Further, Japanese Patent Application Laid-Open No. 11-143983 discusses another technique in which if a user corrects a character recognition result, a portion that is incorrectly recognized in a similar way is searched from uncorrected portions, and a similar correction is applied to the searched portion.

Further, the increasing use of smartphones, digital cameras, and other devices in recent years has enabled acquisition of image information including character information with ease. This leads to a development of a large market relating to acquisition of character information by character recognition processing in a variety of measurement environments. For example, there is a use case in which serial numbers engraved on tires of dump trucks are used to manage the tires in a quarry such as a mine. In a possible management method, images of the serial numbers engraved on the tires are captured with a smartphone, a digital camera, or the like, and character recognition processing is performed on the captured images to obtain recognized serial numbers to be used to manage the tires. However, if a captured image such as a captured image of a serial number engraved on a tire has a low contrast between characters and a background or contains noise due to significant contamination on a surface, accurate detection of the outlines of the characters is difficult with the conventional techniques.

In a case where the conventional techniques in which characters are cut based on the outlines of the characters is applied to an image from which the outlines of characters are difficult to detect accurately, the cutting positions of the characters are often inappropriate, and the burden of correcting recognition results on the user increases.

SUMMARY OF THE INVENTION

According to an aspect of the embodiments, an information processing apparatus includes a memory, and at least one processor in communication with the memory, wherein the at least one processor performs first setting of a search region for a recognition target image, second setting of cut regions at a plurality of positions in the search region, and character detection by extracting images respectively corresponding to the plurality of set cut regions, comparing each of the extracted images with dictionary data to detect candidate character information and position information about the cut region corresponding to the candidate character, and outputting as a recognition result the candidate character information that has a highest evaluation value from the detected candidate character information, wherein based on the position information about the cut region corresponding to the recognition result output in the character detection, by setting a search region for a next character, processing in the second setting and the character detection is repeated for the next character.

Further features of the disclosure will become apparent from the following description of exemplary embodiments with reference to the attached drawings.

BRIEF DESCRIPTION OF THE DRAWINGS

FIG. 1 illustrates an example of external views of a mobile terminal.

FIG. 5 is a conceptual diagram illustrating character recognition processing.

FIG. 9 illustrates an example of how cut regions are set again after correction processing is performed.

DESCRIPTION OF THE EMBODIMENTS

Figure 2:
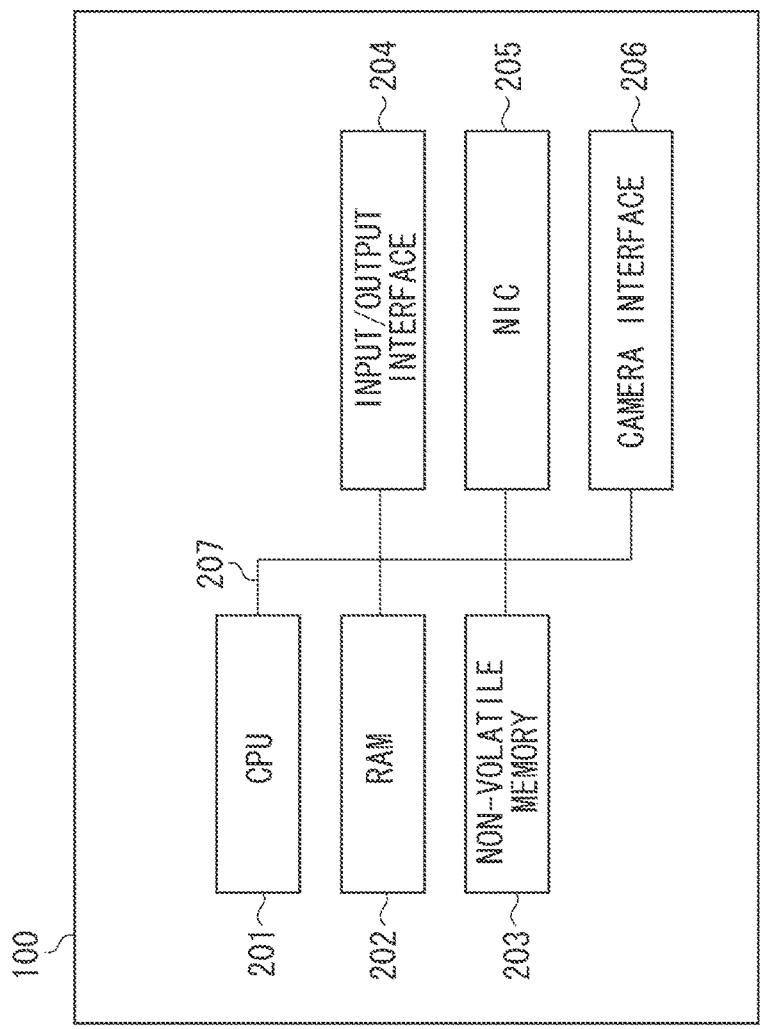
FIG. 2 is a block diagram illustrating an example of a hardware configuration.

A mobile terminal is described as an example of an information processing apparatus according to an exemplary embodiment. The mobile terminal is a terminal capable of communicating with an external device using a wireless communication function or a wired communication function.

FIG. 1 illustrates external views of a mobile terminal 100 (front side portion 101 and back side portion 103 of the mobile terminal 100) and a tire as a subject 105. The front side portion 101 of the mobile terminal 100 includes a touch panel 102 and has two functions of a display function and a touch operation input function. The back side portion 103 of the mobile terminal 100 includes a camera unit 104 configured to capture an image of a subject to input the captured image. In the present exemplary embodiment, a user of the mobile terminal 100 captures an image of the subject 105 and executes character recognition processing using a mobile application (details of the mobile application will be described below) operated by a central processing unit (CPU) of the mobile terminal 100. The subject 105 is a tire as an example of a subject. An image of a portion where a serial identification (ID) (also referred to as "serial number") of the tire is specified is captured with the camera unit 104 of the mobile terminal 100 to acquire a captured image 106. A serial ID 107 is a serial number engraved on the tire and is an ID for uniquely identifying the tire.

While the tire is described as an example of the subject 105 in the present exemplary embodiment, the subject is not limited to the tire. The mobile application described below can capture an image of the subject 105 and output the captured image to the touch panel 102.

FIG. 2 illustrates an example of a hardware configuration of the mobile terminal 100. A processor 201 is a central processing unit (CPU) configured to realize various functions by executing various programs. A random access memory (RAM) 202 is a unit used to store various types of information including instructions to cause the processor 201 to perform operations describes in the following and in the flowcharts, and is used as a temporary working memory area of the processor 201. A non-volatile memory (e.g., read-only memory (ROM)) 203 is a unit configured to store various types of programs and data. The processor 201 loads a program stored in the non-volatile memory 203 into the RAM 202 and executes the program. More specifically, the processor 201 (computer) of the mobile terminal 100 executes the program to function as processing units illustrated in FIG. 3 and executes steps of a sequence described below. The non-volatile memory 203 may be a flash memory, hard disk drive (HDD) or solid state disk (SSD). All or some of the functions of the mobile terminal 100 and processing of the sequences described below may be realized using dedicated hardware. An input/output interface 204 transmits and receives data to and from the touch panel 102. A network interface card (NIC) 205 is a unit configured to connect the mobile terminal 100 to a network (not illustrated). A camera interface 206 is connected to the camera unit 104 to input the image of the subject 105 into the mobile terminal 100. The above-described units can transmit and receive data via a bus 207.

Figure 3:
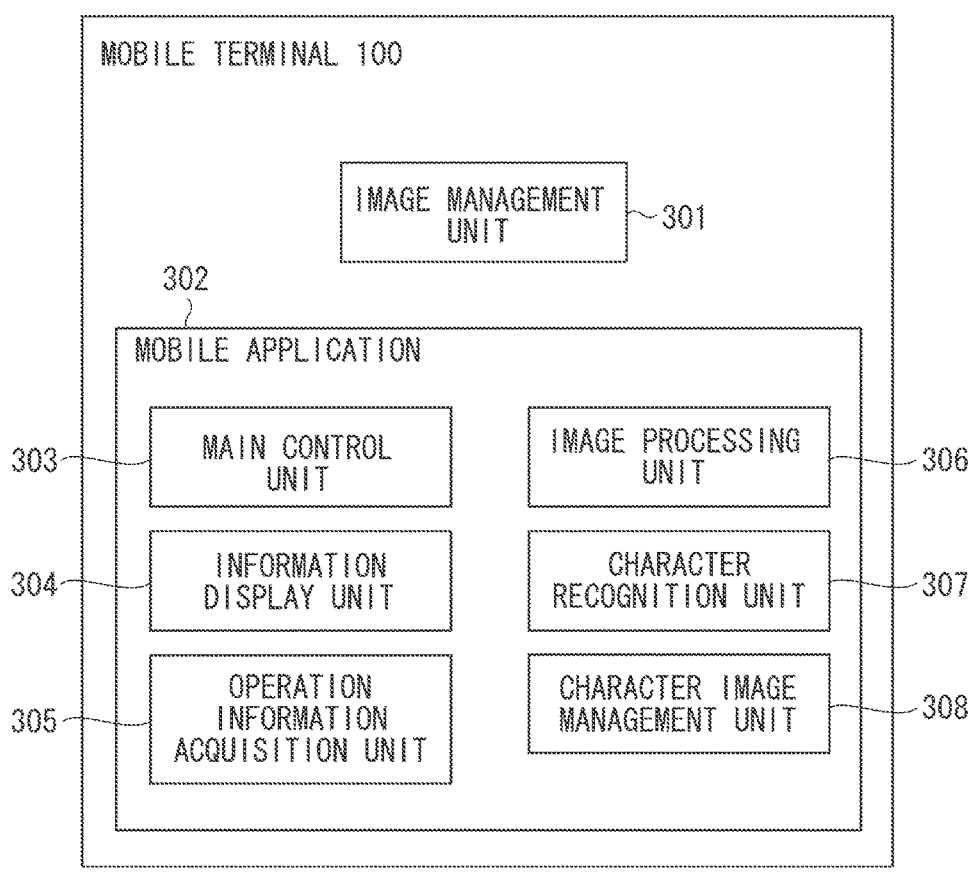
FIG. 3 is a block diagram illustrating an example of a software configuration of a mobile terminal.

Next, a software configuration of the mobile terminal 100 is described. FIG. 3 is a conceptual diagram illustrating an example of the software configuration of the mobile terminal 100. The processor 201 of the mobile terminal 100 executes a mobile application (application program for mobile terminal) 302 to function as processing units (processing modules) 303 to 308. Further, an operating system (OS) (not illustrated) of the mobile terminal 100 functions as an image management unit 301.

The image management unit 301 manages images and application data. The OS provides a control application programming interface (API) for the use of the image management unit 301. Each application uses the control API to perform processing to acquire and store images and application data from and in the image management unit 301.

The mobile application 302 is an application executable by downloading and installing therein using an installation function of the OS of the mobile terminal 100. The mobile application 302 performs various types of data processing on the image of the subject 105 input via the camera interface 206.

The main control unit 303 gives instructions to module units (303 to 308) described below and manages the module units.

Figure 6:
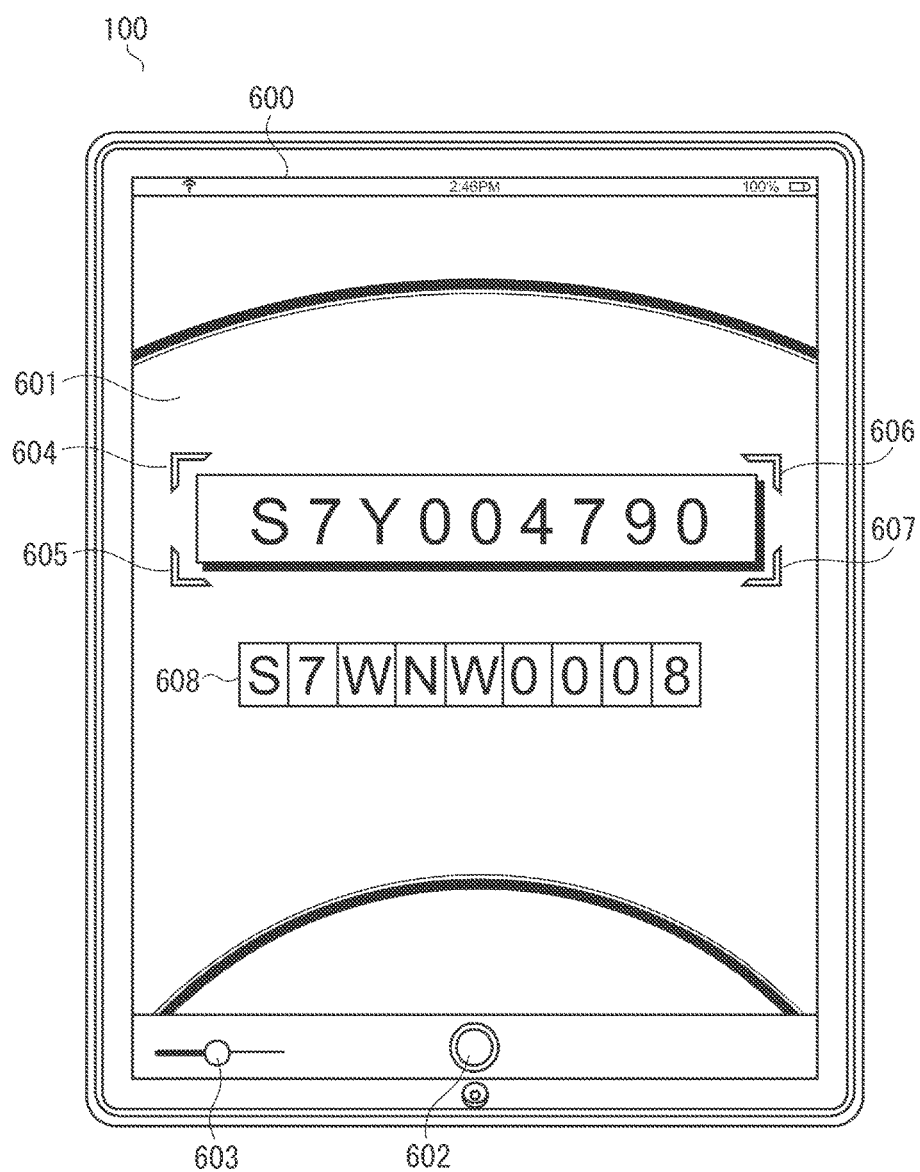
FIG. 6 illustrates an example of a recognition result display screen.
Figure 7:
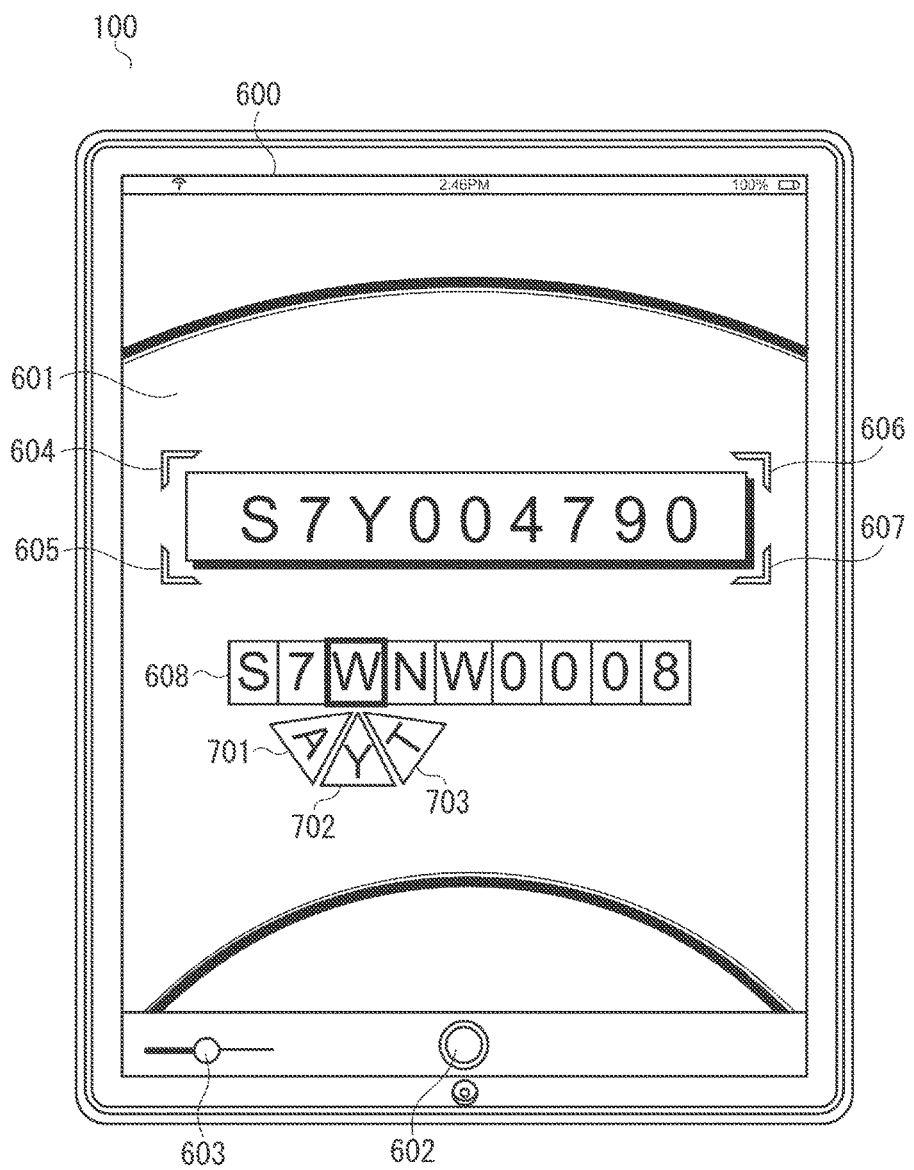
FIG. 7 illustrates an example of a display screen displayed when an instruction to correct a recognition result is given.
Figure 8:
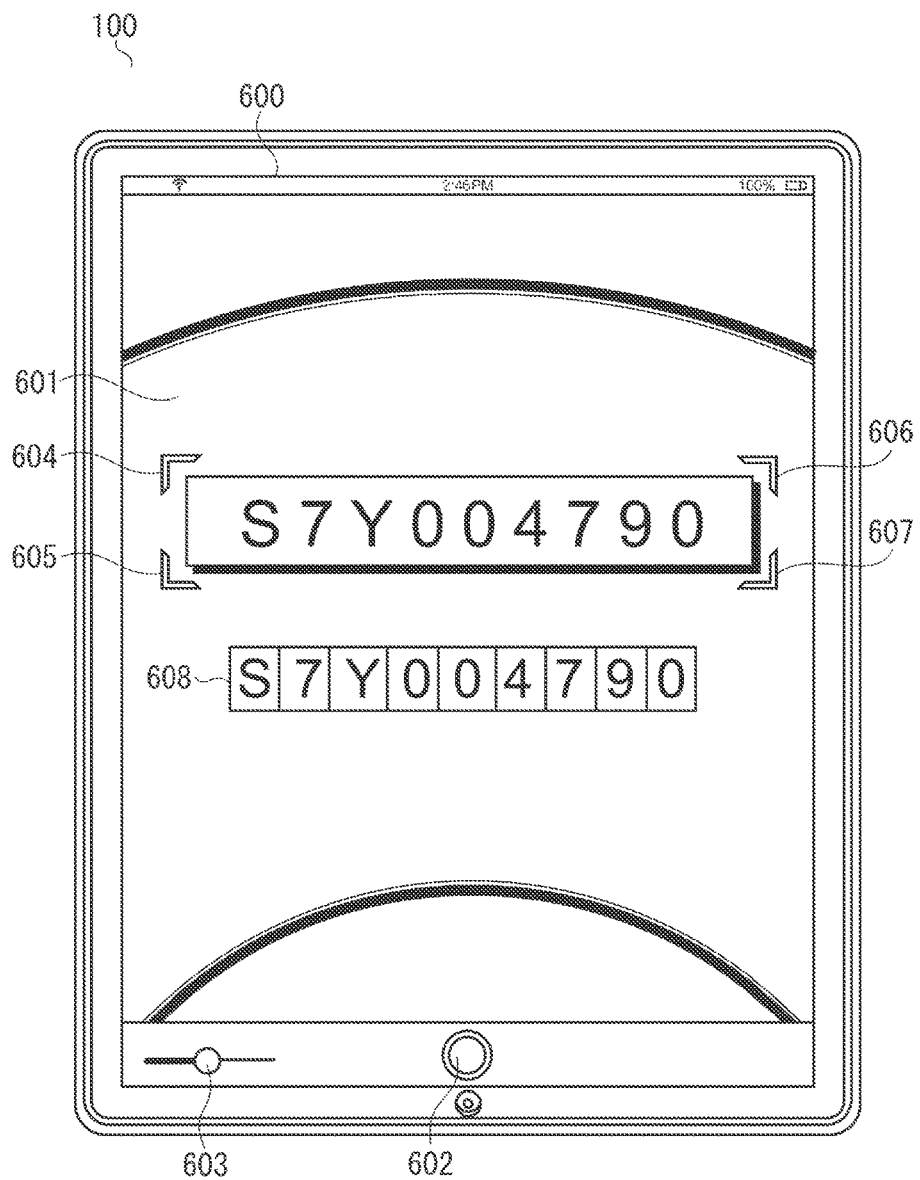
FIG. 8 illustrates an example of a display screen displayed after the recognition result is corrected.

The information display unit 304 performs control to display on the touch panel 102 a user interface (UI) of the mobile application 302 as illustrated in FIGS. 6 to 8 in accordance with an instruction from the main control unit 303.

FIGS. 6 to 8 each illustrate an example of a screen (mobile terminal screen 600) of the UI (UI for mobile terminal) of the mobile application 302. The mobile terminal screen 600 is displayed on the touch panel 102 of the mobile terminal 100. The mobile terminal screen 600 displays in a region 601 the image input using the camera unit 104 and receives an operation (user operation) performed by a user on the image, UI, or the like. A shutter button 602 is a button for storing the image input from the camera unit 104 in the RAM 202 or the image management unit 301. Hereinafter, the stored image will be referred to as a captured image. A zoom button 603 is a button for enlarging and reducing the displayed image. Guides 604 to 607 are guides to the position of an image of a recognition target to be captured. A user captures an image of the tire after adjusting the image-capturing position so that that the serial ID 107 of the recognition target is located within a rectangle region surrounded by the four guides 604 to 607. A display region 608 is a display region where a result of character recognition of the serial ID 107 is displayed. If the recognition result is incorrect, the user touches a correction target character in the recognition result display region 608 and corrects the recognition result. At the touch of the correction target character in the recognition result display region 608 on the screen illustrated in FIG. 6 by the user, candidate characters for correction of the touched character are displayed in candidate character regions 701 to 703 as in a screen illustrated in FIG. 7. If any one of the candidate character regions 701 to 703 is touched on the screen illustrated in FIG. 7, the character in the recognition result display region 608 is updated with the selected candidate character (a screen illustrated in FIG. 8 is an example of a screen displayed after the candidate character region 702 is touched to correct the character).

The form (e.g., position, size, range, arrangement, displayed contents) of the UI of the mobile application 302 is not limited to the illustrated form, and any appropriate configuration that can realize the functions of the mobile terminal 100 can be employed.

Referring back to FIG. 3, the modules are further described. The operation information acquisition unit 305 acquires information about a user operation performed on the UI of the mobile application 302, and notifies the main control unit 303 of the acquired information. For example, if the user touches the region 601 with a user's hand, the operation information acquisition unit 305 detects information about the touched position on the screen and transmits the detected position information to the main control unit 303.

The image processing unit 306 performs image processing required for execution of character recognition, such as grayscale conversion, edge extraction, and feature amount extraction, on the captured image of the subject 105 input via the camera interface 206.

The character recognition unit 307 cuts from the image processed by the image processing unit 306 a plurality of regions in each of which a character is likely to exist, and compares an image in each of the regions with comparison target character image information (dictionary data) to identify the most similar character.

Figure 4:
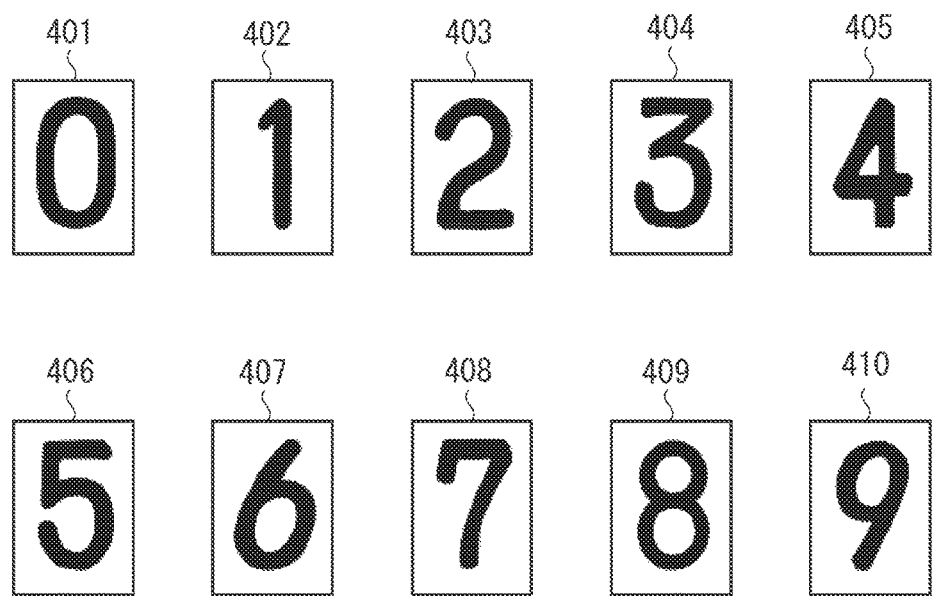
FIG. 4 illustrates an example of character image information (dictionary data).

The character image management unit 308 manages the character image information (information used as dictionary data of a so-called character recognition dictionary) used as a comparison target when the character recognition unit 307 performs character recognition. FIG. 4 illustrates an example of character image information used as a comparison target when the character recognition unit 307 performs character recognition to recognize a character from an image. The character image information is prepared for each character type used on the recognition target tire. While character image information 401 to character image information 410 are examples of images of numbers, the serial ID 107 of the tire, which is the recognition target in the present exemplary embodiment, includes character images of alphabets of capital letters (not illustrated) in addition to the numbers.

The character image information (dictionary data) managed by the character image management unit 308 can be feature information indicating a feature of a character generated based on the font of the character engraved on the tire, or an image of the character of itself. The type of dictionary data to be used may be selected based on an algorithm used in the comparison of the recognition target image with the dictionary data.

FIG. 5 illustrates character recognition processing according to the present exemplary embodiment. A recognition target image 501 is an image generated by cutting a portion of the image of the subject 105 input via the camera unit 104 and the camera interface 206. As illustrated in FIG. 6, the user captures an image of the tire after adjusting the image-capturing position so that the serial ID 107 of the recognition target is located within the guides (guides 604 to 607 in FIG. 6) displayed on the UI of the mobile application 302. The mobile application 302 cuts an image of the portion surrounded by the guides 604 to 607 from the captured image as the recognition target image 501.

Each manufacturer has a predetermined format of the serial ID 107 of the tire. In the present exemplary embodiment, the serial ID 107 has nine digits and includes numbers and capital letters of alphabets.

A captured image of a serial ID engraved on a tire and a background thereof is an image from which the outline of a character is difficult to detect accurately due to a low contrast between the character and a background, and contamination on a surface of the tire (subject). Therefore, if the conventional technique in which characters are cut based on the outlines of the characters is applied thereto, the cutting positions of the characters are likely to be inappropriate. As a result, the accuracy of the character recognition processing is reduced. Thus, in the present exemplary embodiment, first, a region where characters are likely to exist is set as a search region, and within the set search region, a plurality of cut regions is set at different positions and with different sizes, and the cutting of a plurality of region images is repeated. Then, each of the plurality of cut region images is compared with the dictionary data (comparison target character image information managed by the character image management unit 308) to obtain a character recognition result and similarity for each of the region images. Thereafter, the character recognition result having the highest similarity among the character recognition results and the cut region used to obtain the character recognition result having the highest similarity are determined as a recognition result for the search region. Then, based on the position of the cut region of the recognition result, a search region for the next character is set, and the same processing is repeated. In the present exemplary embodiment, the nine digits of the serial ID 107 included in the recognition target image 501 are recognized sequentially from the first digit (leftmost character).

A search region 502 for the character of the first digit is set at a position with coordinates separated by a predetermined distance from the left end of the recognition target image 501 cut based on the guides 604 to 607. The position of the first search region 502 is preset as a region where the leftmost character is likely to exist when the image is captured so that the serial ID 107 is located within the guides 604 to 607. Then, a cut region 505 is set within the search region 502, and an image of the cut region 505 is extracted and compared with the dictionary data regarding characters that are likely to appear as the first digit, whereby the similarity between the image and each of the characters contained in the dictionary data is evaluated. Further, the cut region 505 is set at a plurality of positions different in horizontal (x-axis direction) and vertical (y-axis direction) directions within the search region 502, and each of the images of the cut regions 505 at the plurality of positions is compared with the dictionary data to evaluate the similarity. In other words, the cut region 505 of a predetermined size is set at a plurality of positions so as to encompass the entire search region 502, and each of the images of the cut regions 505 at the plurality of positions is compared with the dictionary data. Thereafter, the width and height of the cut region 505 are changed, the cut region 505 is re-set at a plurality of positions so as to encompass the entire search region 502, and image data is extracted and compared with the dictionary data. For example, in a case where the width of the cut region 505 is changed in three patterns and the height in two patterns, the size of the cut region 505 has 3×2=6 patterns in total. Further, in a case where the cut region 505 is set at positions slid four times in the horizontal direction and four times in the vertical directions, the cut region 505 is set at (4+1)×(4+1)=25 positions within the search region 502. Since the size of the cut region 505 is changed in the six patterns and the cut region 505 is set at the 25 positions, the number of times an image of the cut region 505 is cut from the search region 502 is 6×25=150 times in total. Then, each time the image is cut, the image is compared with the dictionary data (comparison target character image information) regarding the characters that are likely to appear as the first digit, whereby the similarity between the image and each of the characters is evaluated.

Among the results of evaluation of all the images of the cut regions 505, the character having the highest similarity is determined as a recognition result of the first digit, and the position of the cut region 505 with the highest similarity is set as the position of the character of the first digit. A position 504 indicates the cut position of the case where "B" having the highest similarity is determined as a recognition result of the character of the first digit.

Thereafter, a search region 503 for the next adjacent character (the second character from the left) is set. The search region 503 is set at a relative position from the position 504 of the recognition result of the first digit. For the character of the second digit, a plurality of cut regions 506 is set within the search region 503, and each of the plurality of cut regions 506 is evaluated to determine a character having the highest similarity, as in the case of the first digit. Similarly, for the third and subsequent digits, the setting of a search region, the setting of cut regions, and the comparison with the dictionary data to evaluate the similarity are sequentially performed to determine characters of recognition results.

As described above, in the case where accurate detection of the outlines of characters from an image is difficult, a plurality of regions is cut at different positions within a search region where the characters are likely to exist, and the character recognition processing is applied to the image based on the plurality of cut regions, whereby the accuracy of the character recognition processing is increased.

Desirably, the search region 502 for the character of the first digit may desirably be set slightly wide, because the image can be shifted rightward or leftward when being captured. On the other hand, the search regions 503 for the characters of the second and subsequent digits may be set narrower than the search region 502, because spaces between the characters are predetermined according to a character string of the subject.

Figure 10:
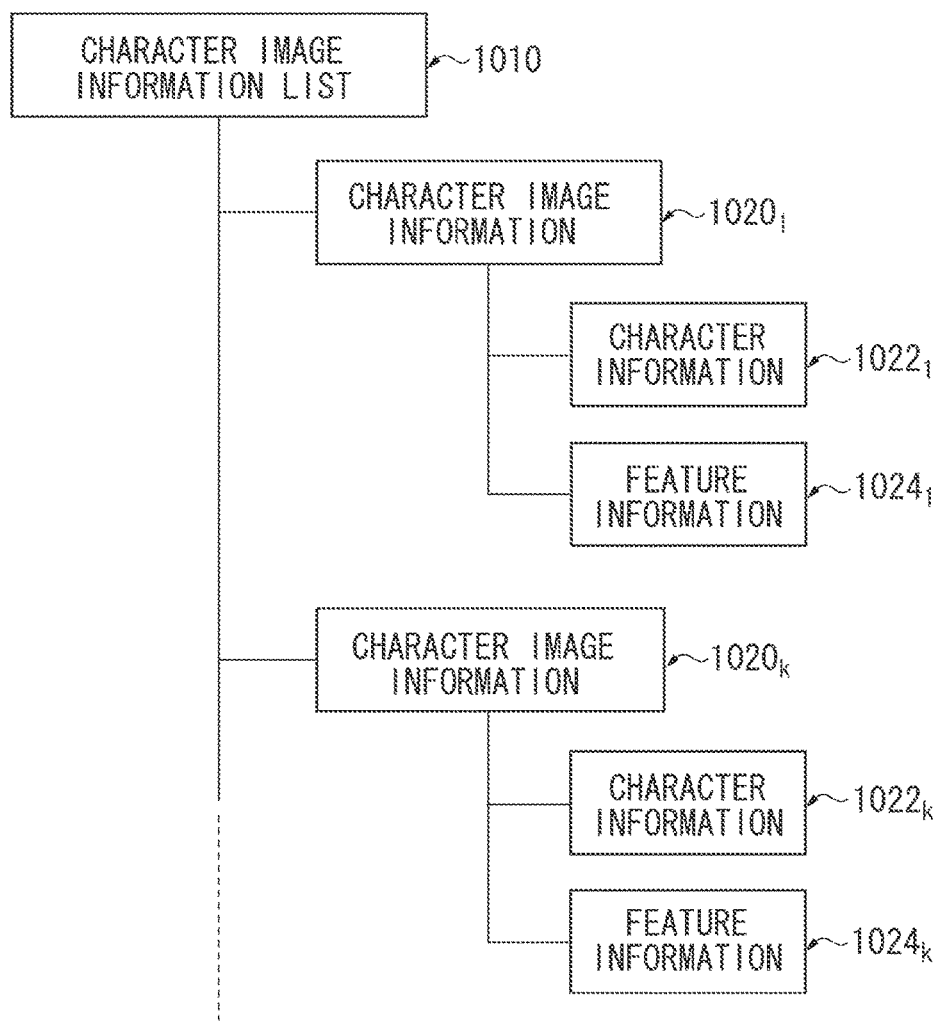
FIG. 10 is a block diagram illustrating an example of a data configuration of character image information (dictionary data).

FIG. 10 illustrates an example of the data configuration of the character image information (dictionary data) managed by the character image management unit 308. A character image information list 1010 includes a plurality of pieces of character image information $1020_j$ (j=1 ..., k ... ). The character image information (dictionary data in character recognition dictionary) $1020_j$ includes character information $1022_j$ (character code) about a character and feature information $1024_j$ extracted from a character image corresponding to the character. The feature information $1024_j$ about the character may be histograms of oriented gradients (HOG) feature amount extracted from the character image or any other feature amounts extracted from the character image.

Figure 11:
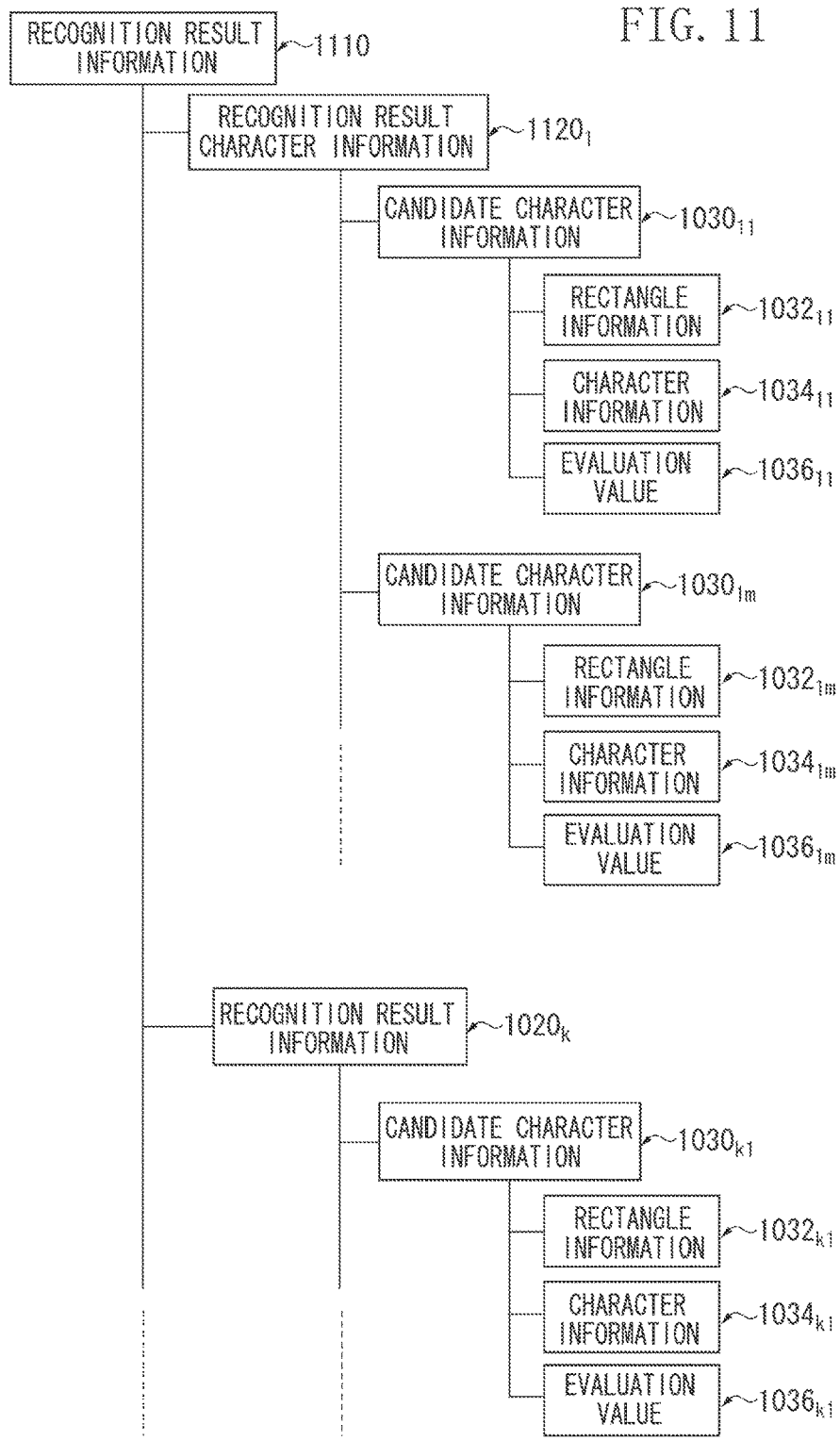
FIG. 11 is a block diagram illustrating an example of data configuration of a character recognition result.

FIG. 11 illustrates an example of a data configuration of information about a result of character recognition processing executed by the character recognition unit 307. The recognition result information 1110 includes a plurality of pieces of recognition result character information $1120_j$ (j=1, ... k, ... ). The recognition result character information corresponds to a recognition result for each character unit, and each of the pieces of recognition result character information includes a plurality of pieces of candidate character information $1130_{ji}$ (j=1, ..., k, ... i=1, ... m, ... ). Since the serial ID 107 according to the present exemplary embodiment includes nine digits, the recognition result information includes nine pieces of recognition result character information respectively corresponding to the nine digits. Further, each of the plurality of pieces of candidate character information $1130_{ji}$ includes rectangle information $1132_{ji}$ (position and size of a cut region corresponding to the candidate character), character information $1134_{ji}$ (character code), and an evaluation value $1136_{ji}$. The evaluation value $1136_{ji}$ is a correlation coefficient (similarity) of a result of comparison between the feature information $1024_j$ of the character image information $1022_j$ in FIG. 10 and feature information extracted from the cut image of the cut region.

Figure 12:
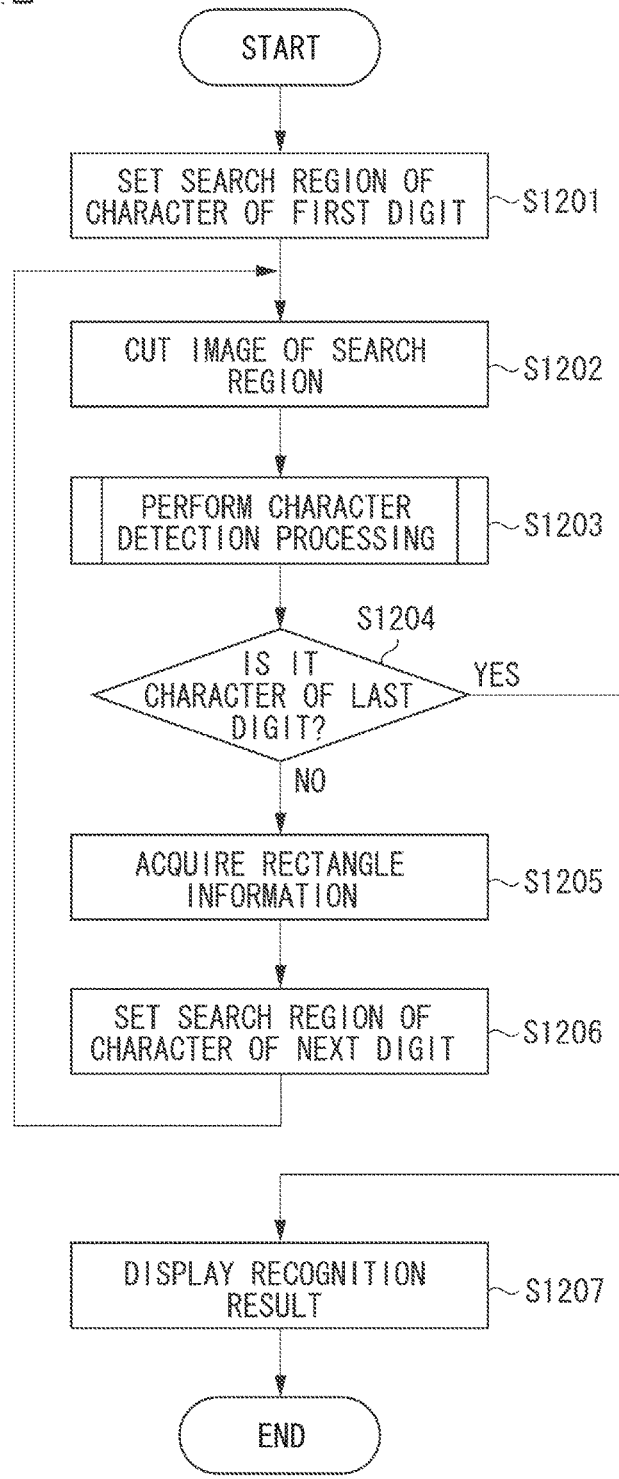
FIG. 12 is a flow chart illustrating details of character recognition processing.

FIG. 12 is a flow chart illustrating details of the character recognition processing executed by the character recognition unit 307 of the mobile application 302 after the image of the tire is captured.

In step S1201, the character recognition unit 307 sets a search region (search region 502 in FIG. 5) of the character of the first digit with respect to the recognition target image 501 cut from the captured image based on the guides.

In step S1202, the character recognition unit 307 cuts an image of the search region.

In step S1203, the character recognition unit 307 sequentially performs on the cut image of the search region the setting of a cut region and the comparison with the dictionary data to determine the similarity, and detects the positions of the cut regions and candidate characters for the respective positions (character detection processing). Details of the processing performed in step S1203 will be described below with reference to FIG. 14.

In step S1204, the character recognition unit 307 determines whether the character is the character of the last digit (the ninth digit). If the character recognition unit 307 determines that the character is the character of the last digit (YES in step S1204), the processing proceeds to step S1207. On the other hand, if the character recognition unit 307 determines that the character is not the character of the last digit (NO in step S1204), the processing proceeds to step S1205.

In step S1205, the character recognition unit 307 searches for the candidate character information having the highest evaluation value (similarity) from the recognition result character information specified in FIG. 11, and acquires the rectangle information (information about the position of the cut region corresponding to the candidate character information).

In step S1206, the character recognition unit 307 sets a search region of the character of the next digit based on the rectangle information acquired in step S1205, and the processing proceeds to step S1202.

In step S1207, the character recognition unit 307 displays the recognition result in the recognition result display region 608 on the screen via the information display unit 304, and the processing is ended.

Figure 13:
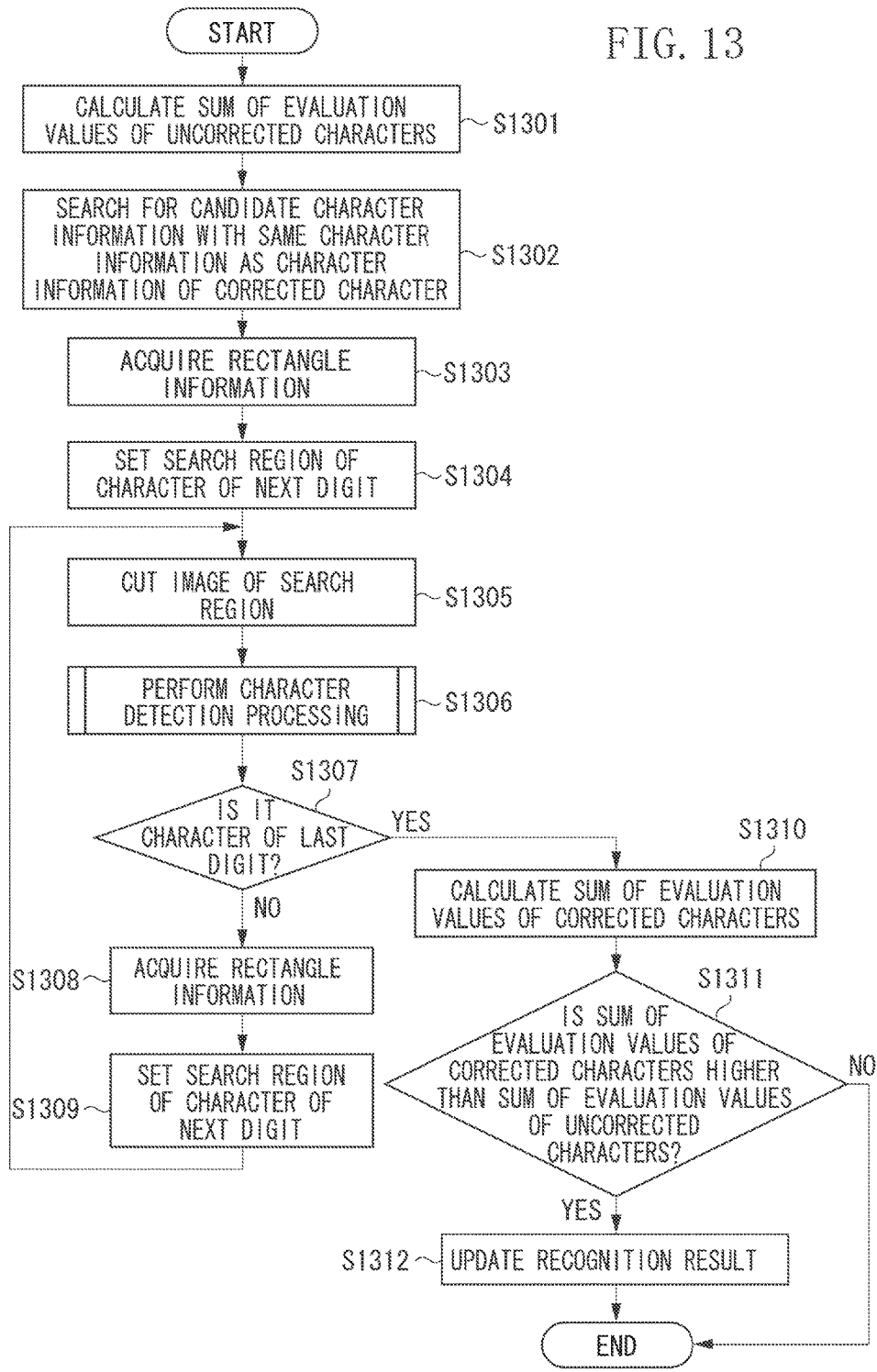
FIG. 13 is a flow chart illustrating processing to be executed after a character recognition result is corrected.

FIG. 13 is a flow chart illustrating the processing executed by the mobile application 302 after a character recognition result is corrected in accordance with a user instruction as illustrated in FIGS. 6 to 8.

In step S1301, the character recognition unit 307 calculates the sum of the evaluation values (highest evaluation values in candidate character information) of the characters of the digits from next to the corrected character to the last.

In step S1302, the character recognition unit 307 searches for candidate character information with the same character information (character code) as the character information of the corrected character from the recognition result character information corresponding to the correction target character.

In step S1303, the character recognition unit 307 acquires rectangle information included in the candidate character information acquired in step S1302.

In step S1304, the character recognition unit 307 re-sets a search region of the character of the next digit based on the rectangle information (information about the position of the cut region corresponding to the corrected character) acquired in step S1303.

In step S1305, the character recognition unit 307 cuts an image of the search region.

In step S1306, the character recognition unit 307 sequentially performs on the cut image of the search region the setting of a cut region and the comparison with the dictionary data to determine the similarity, and detects the positions of the cut regions and candidate characters for the respective positions (character detection processing). Details of the processing performed in step S1306 are similar to those of the processing performed in step S1203 and will be described below with reference to FIG. 14.

In step S1307, the character recognition unit 307 determines whether the character is the character of the last digit (the ninth digit). If the character recognition unit 307 determines that the character is the character of the last digit (YES in step S1307), the processing proceeds to step S1310. On the other hand, if the character recognition unit 307 determines that the character is not the character of the last digit (NO in step S1307), the processing proceeds to step S1308.

In step S1308, the character recognition unit 307 searches for the candidate character information having the highest evaluation value from the recognition result character information, and acquires rectangle information. In step S1309, the character recognition unit 307 sets a search region of the next digit based on the rectangle information acquired in step S1308, and the processing proceeds to step S1305.

As described above, the processing in steps S1305 to S1309 is re-executed based on the search region re-set in step S1304, so that the recognition results for the digit next to the corrected character and the subsequent digits can be different from the results illustrated in FIG. 12.

In step S1310, the character recognition unit 307 calculates the sum of the evaluation values (highest evaluation value in candidate character information) of the characters of the digits from next to the corrected character to the last, based on the results of processing in steps S1305 to S1309.

In step S1311, the character recognition unit 307 determines whether the sum of the evaluation values (of corrected characters after execution of recognition processing in steps S1305 to S1309) that is calculated in step S1310 is higher than the sum of the evaluation values (of uncorrected characters) that is calculated in step S1301. In step S1311, if the character recognition unit 307 determines that the sum of the evaluation values that is calculated in step S1310 is higher than the sum of the evaluation values that is calculated in step S1301 (YES in step S1311), the processing proceeds to step S1312. On the other hand, if the character recognition unit 307 determines that the sum of the evaluation values that is calculated in step S1310 is not higher than the sum of the evaluation values that is calculated in step S1301 (NO in step S1311), the processing is ended.

In step S1312, the character recognition unit 307 updates the result of recognition of the digit from next to the corrected character to the last, using the candidate characters acquired by the processing performed in steps S1305 to S1309, in the recognition result display region 608 on the screen.

Figure 14:
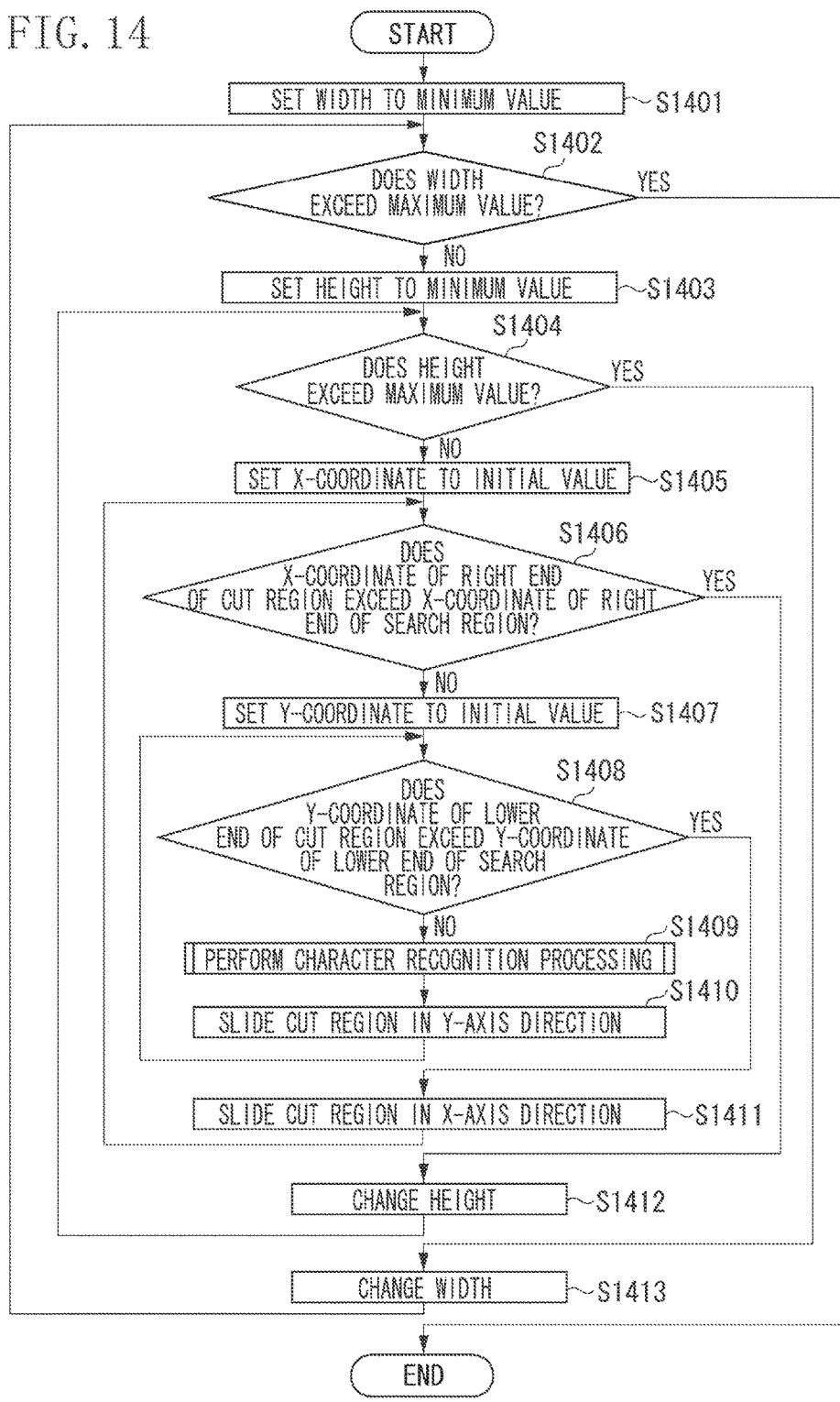
FIG. 14 is a flow chart illustrating details of character detection processing.

FIG. 14 is a flow chart illustrating details of the character detection processing performed in step S1203 in FIG. 12 and in step S1306 in FIG. 13. FIG. 14 illustrates especially details of the processing in which cut regions of different sizes are set at a plurality of positions within a search region and then the recognition processing is performed.

In step S1401, the character recognition unit 307 sets the width of the cut region (cut regions 505 and 506 in FIG. 5) to a minimum value, and the processing proceeds to step S1402.

In step S1402, the character recognition unit 307 determines whether the width of the cut region exceeds a predetermined maximum value. If the character recognition unit 307 determines that the width of the cut region exceeds the predetermined maximum value (YES in step S1402), the processing is ended. On the other hand, if the character recognition unit 307 determines that the width of the cut region does not exceed the predetermined maximum value (NO in step S1402), the processing proceeds to step S1403. In step S1403, the character recognition unit 307 sets the height of the cut region to a minimum value, and the processing proceeds to step S1404.

In step S1404, the character recognition unit 307 determines whether the height of the cut region exceeds a predetermined maximum value. If the character recognition unit 307 determines that the height of the cut region exceeds the predetermined maximum value (YES in step S1404), the processing proceeds to step S1413. In step S1413, the character recognition unit 307 increases the width of the cut region by a predetermined amount, and the processing proceeds to step S1402. On the other hand, in step S1404, if the character recognition unit 307 determines that the height of the cut region does not exceed the predetermined maximum value (NO in step S1404), the processing proceeds to step S1405.

In step S1405, the character recognition unit 307 sets the x-coordinate of the left end of the cut region to an initial value (the x-coordinate of the left end of the search region), and the processing proceeds to step S1406. In step S1406, the character recognition unit 307 determines whether the x-coordinate of the right end of the cut region exceeds the x-coordinate of the right end of the search region. If the character recognition unit 307 determines that the x-coordinate of the right end of the cut region exceeds the x-coordinate of the right end of the search region (YES in step S1406), the processing proceeds to step S1412. In step S1412, the character recognition unit 307 increases the height of the cut region by a predetermined amount, and the processing proceeds to step S1404. On the other hand, in step S1406, if the character recognition unit 307 determines that the x-coordinate of the right end of the cut region does not exceed the x-coordinate of the right end of the search region (NO in step S1406), the processing proceeds to step S1407. In step S1407, the character recognition unit 307 sets the y-coordinate of the upper end of the cut region to an initial value (y-coordinate of the upper end of the search region), and the processing proceeds to step S1408.

In step S1408, the character recognition unit 307 determines whether the y-coordinate of the lower end of the cut region exceeds the y-coordinate of the lower end of the search region. If the character recognition unit 307 determines that the y-coordinate of the lower end of the cut region exceeds the y-coordinate of the lower end of the search region (YES in step S1408), the processing proceeds to step S1411. In step S1411, the character recognition unit 307 slides the cut region in the x-axis direction (the x-coordinate is increased), and the processing proceeds to step S1406. On the other hand, in step S1408, if the character recognition unit 307 determines that the y-coordinate of the lower end of the cut region does not exceed the y-coordinate of the lower end of the search region (NO in step S1408), the processing proceeds to step S1409. In step S1409, the character recognition unit 307 compares the image of the cut region with the character image information (dictionary data) (character recognition processing). Details of the processing performed in step S1409 will be described below with reference to FIG. 15. In step S1410, the character recognition unit 307 slides the cut region in the y-axis direction (y-coordinate is increased), and the processing proceeds to step S1408.

Figure 15:
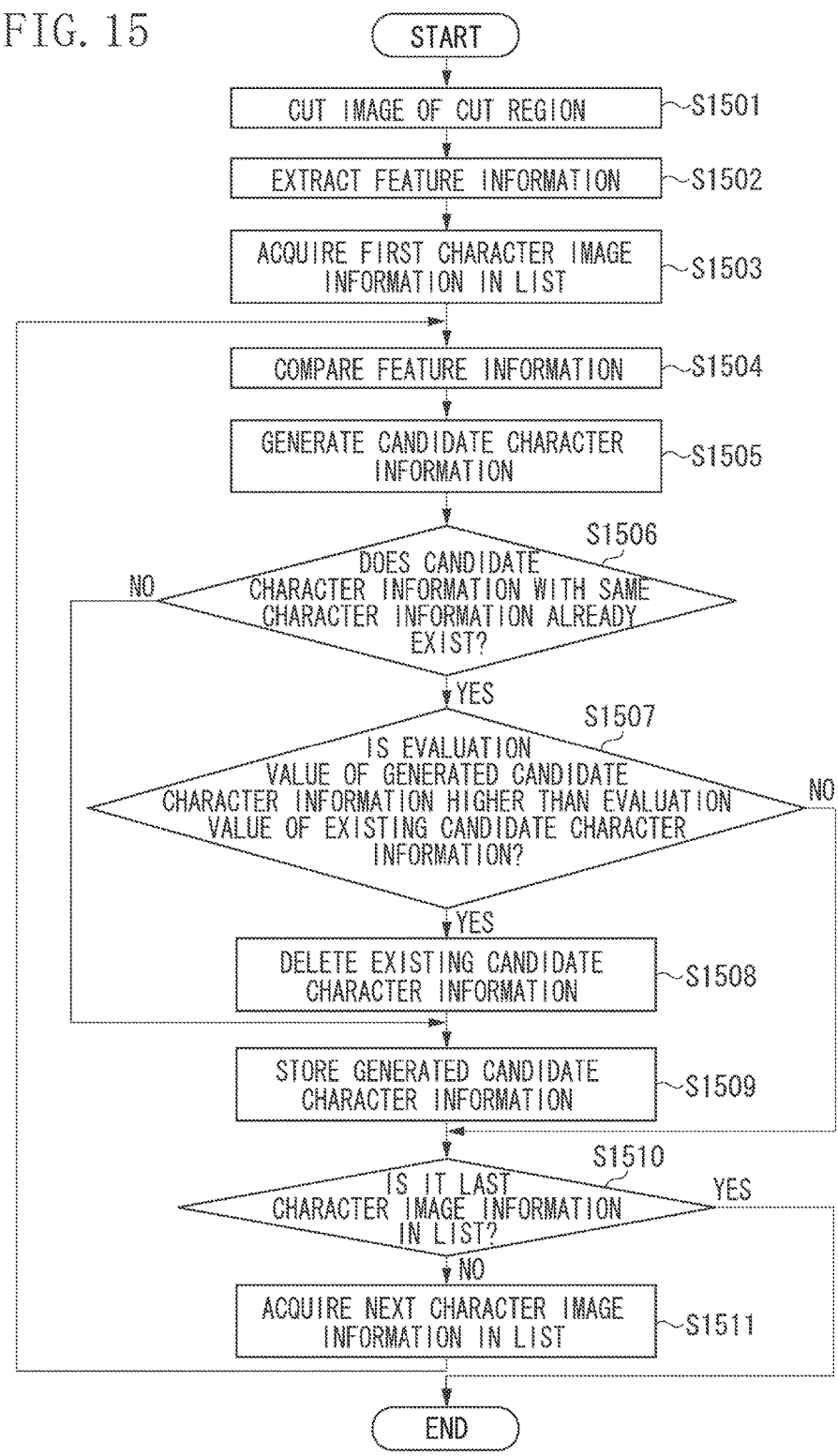
FIG. 15 is a flow chart illustrating details of character recognition processing.

FIG. 15 is a flow chart illustrating details of the character recognition processing in step S1409 in FIG. 14.

In step S1501, the character recognition unit 307 cuts the image of the cut region (cut regions 505 and 506 in FIG. 5). In step S1502, the image processing unit 306 extracts feature information (HOG feature amount) from the cut image.

In step S1503, the character recognition unit 307 acquires the first character image information (dictionary data) in the character image information list illustrated in FIG. 10. In step S1504, the character recognition unit 307 compares the feature information included in the acquired character image information with the feature information extracted in step S1502 to obtain a correlation coefficient (similarity) as an evaluation value.

In step S1505, the character recognition unit 307 generates candidate character information illustrated in FIG. 11, and sets as the evaluation value the correlation coefficient obtained as a result of the comparison in step S1504. At this time, the character information of the character image information is set as the character information (character code) of the candidate character information, and the position and size of the cut region are set as the rectangle information.

In step S1506, the character recognition unit 307 searches the candidate character information of the recognition result character information (illustrated in FIG. 11) regarding the character of the digit that is being processed, and determines whether candidate character information with the same character information as the character information of the candidate character information generated in step S1505 already exists. In step S1506, if the character recognition unit 307 determines that no candidate character information with the same character information exists (NO in step S1506), the processing proceeds to step S1509. On the other hand, if the character recognition unit 307 determines that candidate character information with the same character information already exists (YES in step S1506), the processing proceeds to step S1507.

In step S1507, the character recognition unit 307 determines whether the evaluation value of the candidate character information generated in step S1505 is higher than the evaluation value of the existing candidate character information. If the character recognition unit 307 determines that the evaluation value of the candidate character information generated in step S1505 is not higher than the evaluation value of the existing candidate character information (NO in step S1507), the processing proceeds to step S1510. On the other hand, if the character recognition unit 307 determines that the evaluation value of the candidate character information generated in step S1505 is higher than the evaluation value of the existing candidate character information (YES in step S1507), the processing proceeds to step S1508. In step S1508, the character recognition unit 307 deletes the existing candidate character information in the recognition result character information. Then, in step S1509, the character recognition unit 307 stores in the recognition result character information the candidate character information generated in step S1505, and the processing proceeds to step S1510.

In step S1510, the character recognition unit 307 determines whether the character image information is the last character image information in the character image information list. If the character recognition unit 307 determines that the character image information is not the last character image information (NO in step S1510), the processing proceeds to step S1511. In step S1511, the character recognition unit 307 acquires the next character image information in the character image information list. On the other hand, in step S1510, if the character recognition unit 307 determines that the character image information is the last character image information (YES in step S1510), the processing is ended.

FIG. 9 illustrates how the cut regions are re-set after the correction processing is performed on the character recognition results in the present exemplary embodiment.

An image 901 is a captured image of the serial ID 107 of the tire. The processing illustrated in FIG. 12 is executed on the image 901 to obtain the result specified in the recognition result display region 608 illustrated in FIG. 6 as the first character recognition result. The positions of the cut regions corresponding to the first character recognition result 902 are positions 903. Thereafter, if the third character from the left is corrected in accordance with a user instruction as described above with reference to FIG. 7, a rectangle region corresponding to the corrected character is searched, and execution of the setting of a search region, the setting of cut regions, and the recognition processing is repeated with respect to the digit next to the corrected character and the subsequent digits. A character recognition result 904 and cut regions 905 are a character recognition result and cut regions obtained as a result of execution of the processing illustrated in FIG. 13. In the first cut regions 903, the cut region of the character of the third digit is incorrectly determined to lead to incorrect results for the cut regions of the fourth and subsequent digits and, therefore, the character recognition result is also incorrect. Then, if the third digit is corrected by the user, the processing illustrated in FIG. 13 is executed. Consequently, the fourth and subsequent digits are corrected in the corrected cut regions 905.

As described above, if the user corrects a recognition result, the setting of a search region and the setting of cut regions within the set search region are executed for the character next to the corrected character and the subsequent characters, and then the correction processing is performed on the recognition result. In this way, even in a case where a single character is incorrectly recognized to cause incorrect recognition of subsequent characters, if the single character is corrected, the incorrectly-recognized subsequent characters are also corrected. This reduces the burden of correcting the incorrect recognition results on the user. Further, the evaluation values of all the uncorrected characters following the corrected character are compared with the evaluation values of the corrected characters, and if the evaluation values of the corrected characters are higher than the evaluation values of the uncorrected characters, the corrected recognition result is reflected on the screen, whereby the screen is prevented from being updated with a worse recognition result than the uncorrected recognition result.

Other Embodiments

Embodiment can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-045469, filed Mar. 9, 2016, which is hereby incorporated by reference herein in its entirety.

What is claimed is:

1. An information processing apparatus comprising:
at least one processor; and
a memory that stores a program,
wherein the at least one processor executes the program to perform:
setting a search region in a recognition target image;
setting cut regions at a plurality of different positions in the set search region;
obtaining candidate character information by extracting images respectively corresponding to the set cut regions and comparing each of the extracted images with dictionary data; and
outputting, as a recognition result of the set search region, the candidate character information that has a highest evaluation value from the obtained candidate character information,
wherein a next search region for a next character is set based on position information about the cut region corresponding to the outputted recognition result, wherein next cut regions are set at a plurality of positions in the set next search region, wherein next candidate character information of a next character is obtained by extracting images respectively corresponding to the set next cut regions and comparing each of the extracted images with the dictionary data, and wherein the next candidate character information that has a highest evaluation value from the obtained next candidate character information is outputted as a recognition result of the next character.

2. The information processing apparatus according to claim 1, wherein the processor further executes the program to perform:
displaying the output recognition result;
correcting the displayed recognition result according to a user instruction; and
acquiring position information about the cut region corresponding to the corrected recognition result, and
wherein a search region for a character next to the corrected recognition result is re-set based on the acquired position information, wherein cut regions are re-set at a plurality of positions in the re-set next search region, and wherein candidate character information for a character next to the corrected recognition result is obtained by extracting images respectively corresponding to the re-set next cut regions and comparing each of the extracted images with the dictionary data.

3. The information processing apparatus according to claim 2, wherein an evaluation value of the obtained candidate character information for the character next to the corrected recognition result is compared with an evaluation value of the next candidate character information to determine whether to correct a result of recognition of the character next to the corrected recognition result.

4. A non-transitory computer-readable storage medium storing a computer program that, when executed by a computer, causes the computer to perform:
setting a search region in a recognition target image;
setting cut regions at a plurality of different positions in the set search region;
obtaining candidate character information by extracting images respectively corresponding to the cut regions set in the second setting and comparing each of the extracted images with dictionary data; and
outputting, as a recognition result of the set search region, the candidate character information that has a highest evaluation value from the obtained candidate character information,
wherein a next search region for a next character is set based on position information about the cut region corresponding to the outputted recognition result, wherein next cut regions are set at a plurality of positions in the set next search region, wherein next candidate character information of a next character is obtained by extracting images respectively corresponding to the set next cut regions and comparing each of the extracted images with the dictionary data, and wherein the next candidate character information that has a highest evaluation value from the obtained next candidate character information is outputted as a recognition result of the next character.

5. The non-transitory computer-readable storage medium according to claim 4, wherein the computer program causes the computer to further perform:
displaying the output recognition result;
correcting the displayed recognition result according to a user instruction; and
acquiring position information about the cut region corresponding to the corrected recognition result,
wherein a search region for a character next to the corrected recognition result is re-set based on the acquired position information, wherein cut regions are re-set at a plurality of positions in the re-set next search region, and wherein candidate character information for a character next to the corrected recognition result is obtained by extracting images respectively corresponding to the re-set next cut regions and comparing each of the extracted images with the dictionary data.

6. The non-transitory computer-readable storage medium according to claim 5, wherein the computer program causes the computer to further perform: comparing an evaluation value of the obtained candidate character information for the character next to the corrected recognition result with an evaluation value of the next candidate character information to determine whether to correct a result of recognition of the character next to the corrected recognition result.

7. An information processing method executed by an apparatus, the method comprising:
setting a search region in a recognition target image;
setting cut regions at a plurality of different positions in the set search region;
obtaining candidate character information by extracting images respectively corresponding to the set cut regions and comparing each of the extracted images with dictionary data; and
outputting, as a recognition result of the set search region, the candidate character information that has a highest evaluation value from the obtained candidate character information,
wherein a next search region for a next character is set based on position information about the cut region corresponding to the outputted recognition result, wherein next cut regions are set at a plurality of positions in the set next search region, wherein next candidate character information of a next character is obtained by extracting images respectively corresponding to the set next cut regions and comparing each of the extracted images with the dictionary data, and wherein the next candidate character information that has a highest evaluation value from the obtained next candidate character information is outputted as a recognition result of the next character.

8. The information processing method according to claim 7 further comprising:
displaying the output recognition result;
correcting the displayed recognition result according to a user instruction; and
acquiring position information about the cut region corresponding to the corrected recognition result, wherein a search region for a character next to the corrected recognition result is re-set based on the acquired position information, wherein cut regions are re-set at a plurality of positions in the re-set next search region, and wherein candidate character information for a character next to the corrected recognition result is obtained by extracting images respectively corresponding to the re-set next cut regions and comparing each of the extracted images with the dictionary data.

9. The information processing method according to claim 8 further comprising comparing an evaluation value of the obtained candidate character information for the character next to the corrected recognition result with an evaluation value of the next candidate character information to determine whether to correct a result of recognition of the character next to the corrected recognition result.

* * * * *